(12) United States Patent
Do et al.

(10) Patent No.: US 7,389,934 B2
(45) Date of Patent: Jun. 24, 2008

(54) ON-DEMAND POINT-OF-SALE SCANNER ACCESS

(75) Inventors: Phuc K. Do, Morrisville, NC (US); Justin M. Pierce, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 11/139,832

(22) Filed: May 27, 2005

(65) Prior Publication Data

US 2006/0266825 A1   Nov. 30, 2006

(51) Int. Cl.
*G06K 7/10* (2006.01)
(52) U.S. Cl. ............... 235/472.01; 235/383; 235/462.45
(58) Field of Classification Search ............ 235/472.01, 235/472.02, 472.03, 381, 383, 385, 462.44, 235/462.45, 462.46
See application file for complete search history.

(56) References Cited

U.S. PATENT DOCUMENTS

| 5,557,088 | A | 9/1996 | Shimizu et al. |
| 6,208,264 | B1 | 3/2001 | Bradney et al. |
| 6,270,011 | B1 | 8/2001 | Gottfried |

(Continued)

FOREIGN PATENT DOCUMENTS

WO    WO 00/55800    9/2000

OTHER PUBLICATIONS

"Portable Self-Checkout Retail System", IBM Technical Disclosure Bulletin, Jun. 1992 vol. 35 No. 1A, p. 315-318 (4 pages).
Wills-Sandford, T. G., "EAN Wands on Petrol Pumps", IBM Technical Disclosure Bulletin, Feb. 1985 vol. 27 No. 9, p. 5328-5330 (3 pages).
Sliwa, Carol, "Retailers Make Trial Offers On Shopping Technologies Test new in-store devices tied to back-end systems", Computerworld, Jan. 17, 2005.
http://www.keepmedia.com/jsp/article_detail_print.jsp, printed May 10, 2005 (2 pages).

*Primary Examiner*—Karl D. Frech
(74) *Attorney, Agent, or Firm*—Marcia L. Doubet; Jason Piche (57) ABSTRACT

Associating and/or disassociating a mobile point-of-sale scanner device with a particular shopper. Shoppers may be identified, for example, using biometrics or by scanning a loyalty card. As an example of using biometrics, the shopper's fingerprint may be scanned as a trigger of the scanner is activated to scan an item's barcode. The fingerprint is preferably transmitted, along with the scanned barcode, to a server or other device for comparison to previously-stored information. The scanner is then automatically associated with the shopper to whom the fingerprint corresponds. In another embodiment, scanned loyalty card information is preferably transmitted (optionally, along with a scanned barcode), such that the scanner is then automatically associated with the shopper to whom the loyalty card corresponds. Disassociating the scanner from a shopper is preferably triggered using a sensor (such as a light) that forms part of the scanner device, whereby the sensor is activated when the shopper releases the scanner device. A timer may be used to filter out accidental activation of the sensor.

15 Claims, 6 Drawing Sheets

U.S. PATENT DOCUMENTS

| | | |
|---|---|---|
| 6,609,102 B2 | 8/2003 | Kolls |
| 6,783,071 B2 | 8/2004 | Levine et al. |
| 2001/0026632 A1 | 10/2001 | Tamai |
| 2002/0169673 A1 | 11/2002 | Prorock et al. |
| 2003/0004889 A1 | 1/2003 | Fiala et al. |
| 2003/0128866 A1 | 7/2003 | McNeal |
| 2004/0138955 A1 | 7/2004 | Song et al. |
| 2007/0272735 A1* | 11/2007 | Silverbrook et al. ........ 235/375 |

* cited by examiner

ON-DEMAND POINT-OF-SALE SCANNER ACCESS

BACKGROUND OF THE INVENTION

The present invention relates generally to point-of-sale scanner devices, and more particularly, to use of such devices for automatically associating and disassociating a scanner device with a shopper in an on-demand manner.

A so-called "shopping buddy" application allow shoppers to roam about a retail store or other environment with an information-transmitting device, gathering various types of information.

In one approach, a shopper goes to an in-store kiosk where a number of scanners are available. The shopper provides identifying information through the kiosk, and the shopping buddy application then assigns one of the available scanners to the shopper. Typically, a light flashes to indicate to the shopper which of the scanners he/she is to use. When a large number of scanners are available, it may be time-consuming and/or cumbersome for the shopper to locate the assigned scanner.

In another approach, a tablet-sized computing device is mounted on a shopping cart. The computing device may be equipped with a barcode scanner. The shopper provides identifying information to the computing device, and can then use the scanner to read barcodes on items as they are placed into the shopping cart.

BRIEF SUMMARY OF THE INVENTION

In one aspect, the present invention provides techniques for automatically associating a scanner device with a user, comprising: capturing, by a scanner device configured with a biometric sensor, biometric information of a user; and scanning, by the scanner device, item-identifying information of an item (such as the item's barcode), such that the captured biometric information and the scanned item-identifying information can be transmitted to a computing device adapted for comparing the captured biometric information to previously-stored biometric information to identify the user and thereby automatically associating the scanner device (and as a result, the scanned item) with the identified user. For subsequent scans, one manner of automatically associating the subsequently-scanned items with the user is to transmit an authentication token to the computing device, instead of biometric information, where this authentication token preferably remains valid until the scanner device is no longer associated with the user.

In another aspect, the present invention provides techniques for automatically associating a scanner device with a user, comprising: capturing, by a scanner device, loyalty card information by scanning a loyalty card of a user, such that the captured loyalty card information can be transmitted to a computing device adapted for comparing the captured loyalty card information to previously-stored loyalty card information to identify the user and thereby automatically associating the scanner device (and as a result, items to be scanned with the scanner) with the identified user; and automatically disassociating the scanner device from the user when the user no longer maintains physical contact with the scanner device. Optionally, the scanned loyalty card information may be transmitted along with item-identifying information of a scanned item. One manner of automatically associating the scanned items with the user is to transmit an authentication token to the computing device, rather than repeatedly scanning and/or transmitting the loyalty card information.

In yet another aspect, the present invention provides techniques for automatically disassociating a scanner device from a user, comprising: automatically associating a scanner device with a particular user upon matching identifying information of the particular user, captured by the scanner device, with previously-stored identifying information of a plurality of users; adding items scanned by the scanner device to a shopping cart of the particular user while the scanner device remains associated with the particular user; detecting, by a sensor of the scanner device, that the particular user is no longer in physical contact with the scanner device; and automatically disassociating the scanner device from the particular user, responsive to the detection. If an authentication token is used while the scanner device remains associated with the user, the disassociation preferably comprises invalidating the authentication token.

In a further aspect, the present invention provides a scanner device adapted for automatic association with a user, the scanner device comprising: a biometric sensor for obtaining biometric information of a user; an item scanner portion for scanning item-identifying information of an item; and a transmitter adapted for transmitting the obtained biometric information to a computing device for comparing the transmitted biometric information to previously-stored biometric information to identify the user and thereby automatically associate the scanner device with the user and for transmitting the item-identifying information to the computing device.

In a still further aspect, the present invention provides techniques for associating a scanner device with a user, comprising: receiving, from a scanner device, biometric information of a user and item-identifying information of an item, the biometric information captured with a biometric sensor of the scanner device and the item-identifying information captured with an item scanning portion of the scanner device; comparing the received biometric information to previously-stored biometric information and thereby identify the user; automatically associating the scanner device with the identified user; and adding the item to a shopping list of the user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

DETAILED DESCRIPTION OF THE INVENTION

Embodiments of the present invention enable quickly associating and/or disassociating a mobile point-of-sale scanner device with a particular shopper, thus enabling items scanned with the scanner device to be added to a list (or other data structure) associated with the shopper, such as the shopper's shopping cart or shopping list. Alternatives for identifying the shopper to the scanner include biometrics and scanning the shopper's loyalty card.

In existing shopping buddy applications, shoppers explicitly identify themselves to the application, thereby providing a distinct association of a device (such as a kiosk-mounted scanner or a cart-mounted computing device) with the shopper. When the shopper is finished shopping, the shopper explicitly disassociates from the device. The shopper may be required to interact with a clerk to check out or otherwise complete the shopping experience. "Quick trip" shoppers may therefore be dissuaded from using these devices.

Using teachings disclosed herein, on-demand association and disassociation between a shopper and mobile point-of-sale scanner device is provided. This allows a shopper to use a shopping buddy application by walking into a store, picking up a scanner, scanning some items, and setting the scanner down when finished. As items are scanned, an identification thereof is preferably transmitted, using wireless transmission, to a server and placed in the shopper's virtual shopping cart or on the shopper's shopping list. When the shopper has finished scanning one or more items, he or she may then check out, ideally without requiring assistance of a clerk.

The on-demand techniques disclosed herein automatically associate the shopper with the scanner, and/or automatically disassociate the shopper from the device. Preferred embodiments thus reduce the number of steps in the shopping experience as well as the length of time required for shopping.

Figure 1:
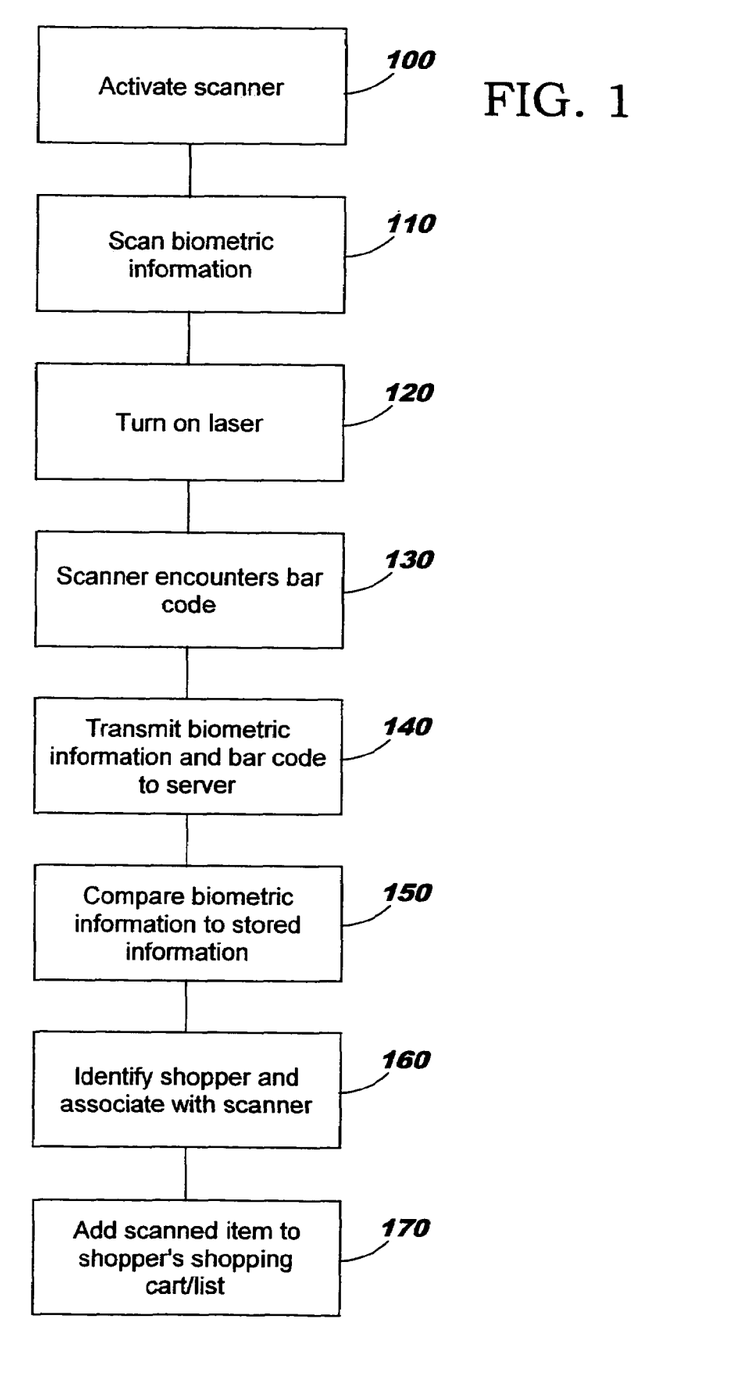
FIG. 1 illustrates an embodiment leveraging biometrics for shopper identification.

In one embodiment, biometric technology such as a fingerprint scan is used for identifying the shopper and thereby associating the shopper with items scanned by that shopper. Referring now to FIG. 1, this embodiment will be described in more detail.

When the shopper makes contact with the biometric scanner (Block 100), which is referred to herein as a fingerprint scanner, the shopper's fingerprint is scanned (Block 110) and the scanner device preferably turns on its laser (Block 120) for barcode scanning. When the scanner encounters a barcode (Block 130), the barcode and the scanned biometric information are preferably transmitted (Block 140) to a server or other device (referred to herein as a server for ease of reference), where the transmitted information is compared to previously-stored information (Block 150). The previously-stored information may be specific to a merchant in whose establishment the shopper is shopping. As another alternative, a repository shared by multiple merchants (or other entities) may be consulted. Upon matching the transmitted biometric information to an entry in the previously-stored information, the shopper to whom the biometric information corresponds is thereby identified (Block 160) and associated with the scanner at which the biometric information was scanned. The scanned item corresponding to the barcode is then added to a virtual shopping cart or shopping list for that shopper (Block 170).

The contact in Block 100 may occur when the shopper activates a trigger or button of the scanner. (See, e.g., trigger 220 in FIG. 2, discussed below.) In another approach, the contact in Block 100 may occur when the shopper initially picks up the scanner. In either approach, following the processing of Block 160, the scanner preferably continues to be associated with this particular shopper until a disassociation occurs. (Disassociation is discussed in more detail below with reference to FIG. 4.) Accordingly, the processing of Blocks 130, 140, and 170 is preferably repeated for subsequently-scanned items. Notably, once the shopper has been initially identified, the scanner and server may negotiate means for subsequently identifying the shopper, such that the shopper's biometric information does need to be repeatedly scanned and/or transmitted. In some embodiments, this comprises generating an authentication token at the server, passing this token back to the scanner, and then transmitting the authentication token from the scanner in subsequent iterations of Block 140.

Figure 2:
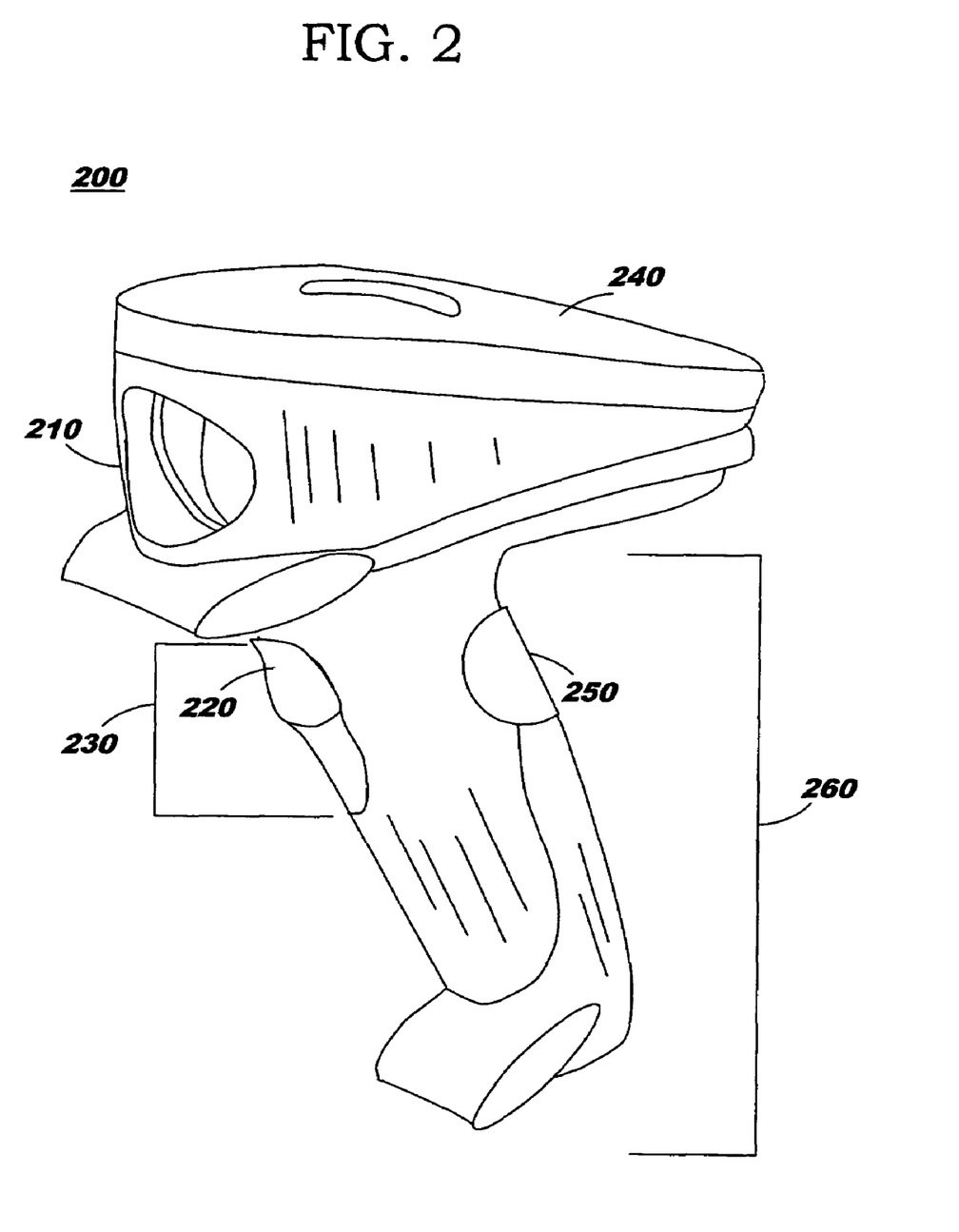
FIG. 2 illustrates a representative scanner device which may be used with one or more embodiments of the present invention.

Referring now to FIG. 2, a representative scanner device 200 that may be used with one or more embodiments of the present invention is shown. The scanner device 200 includes an item scanning portion 210, which may use laser technology for reading the barcode of items. A handle portion 260 of the scanner device, with which the shopper holds the device, preferably includes a trigger portion 230 and a biometric scanning portion 220. The biometric scanning portion may comprise a subset of the trigger portion, as illustrated. Alternatively, the entire trigger portion or an entirely separate portion of the device may be adapted for biometric scanning. A sensor portion 250, used in preferred embodiments for automatically disassociating a scanner device from a shopper (as will be discussed in more detail with reference to FIG. 4), is preferably placed at one or more locations within the handle portion 260 such that the sensor is triggered when the shopper sets the scanner device down or returns it to a docking station.

A scanner device may include buttons for shopping functions such as enabling the shopper to do price checks without purchasing the scanned item, removing previously-scanned items from the shopping cart or list, and so forth. Such buttons have not been illustrated in FIG. 2.

In another embodiment of the present invention, shopper loyalty cards are leveraged for shopper identification and thereby associating the shopper with items subsequently scanned by that shopper. This embodiment will now be described in more detail with reference to FIG. 3.

Figure 3:
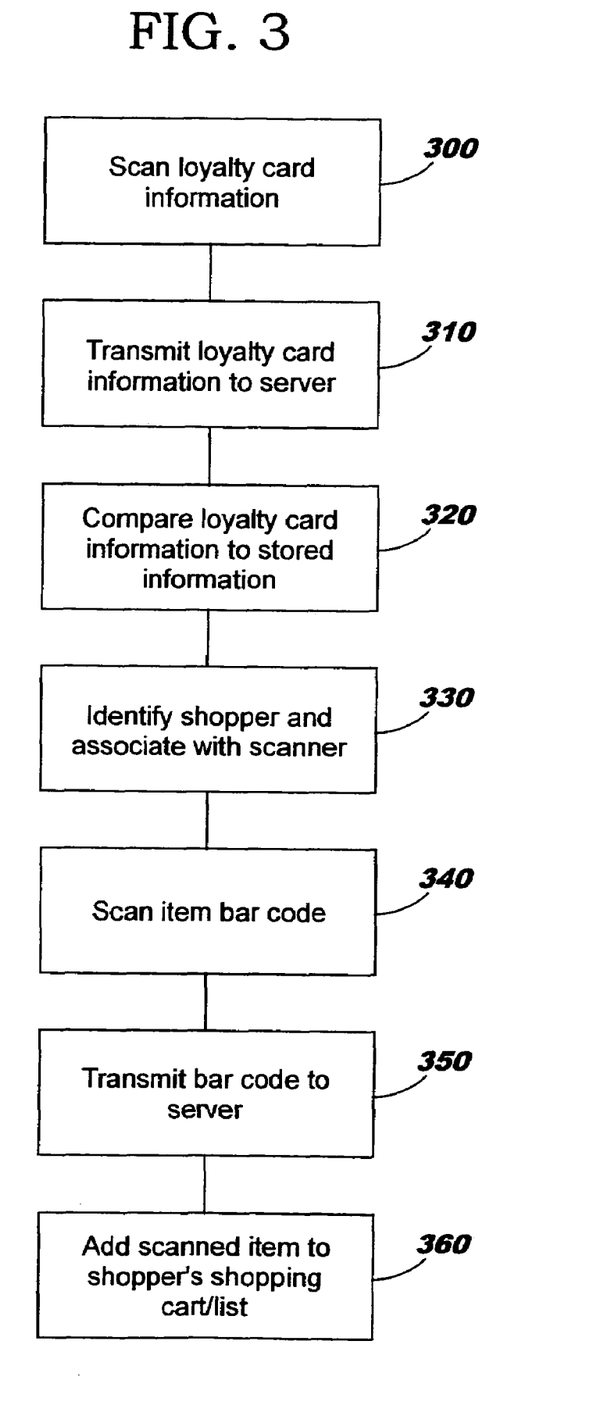
FIG. 3 illustrates an embodiment leveraging shopper loyalty cards for shopper identification.

A shopper's loyalty card is scanned (Block 300). The scanned loyalty card information is transmitted to a server or other device (Block 310). The transmitted loyalty card information is compared to previously-stored information (Block 320). Upon matching the scanned loyalty card information to an entry in the previously-stored information, the shopper to whom the loyalty card corresponds is thereby identified (Block 330) and associated with the scanner at which the loyalty card was scanned. While the shopper holds (or otherwise maintains physical contact with) the scanner, any item scan that takes place (Block 340) is preferably transmitted (Block 350) to a server or other device along with the scanned loyalty card information. The scanned item is added to a virtual shopping cart or shopping list for that shopper (Block 360).

Once the association depicted in Block 330 occurs, the scanner preferably continues to be associated with this particular shopper until a disassociation occurs. Accordingly, the processing of Blocks 340-360 is preferably repeated for subsequently-scanned items. As discussed above, once the shopper has been initially identified, the scanner and server may negotiate means for subsequently identifying the shopper, such as generating an authentication token at the server, passing this token back to the scanner, and then transmitting the authentication token from the scanner (i.e., in subsequent iterations of Block 350). As an alternative to the logic flow shown in FIG. 3, the transmission in Block 310 may be delayed until the shopper has scanned a first item. It will be obvious to one of skill in the art, once the teachings disclosed herein are known, how the processing depicted in FIG. 3 may be modified for this alternative.

Figure 4:
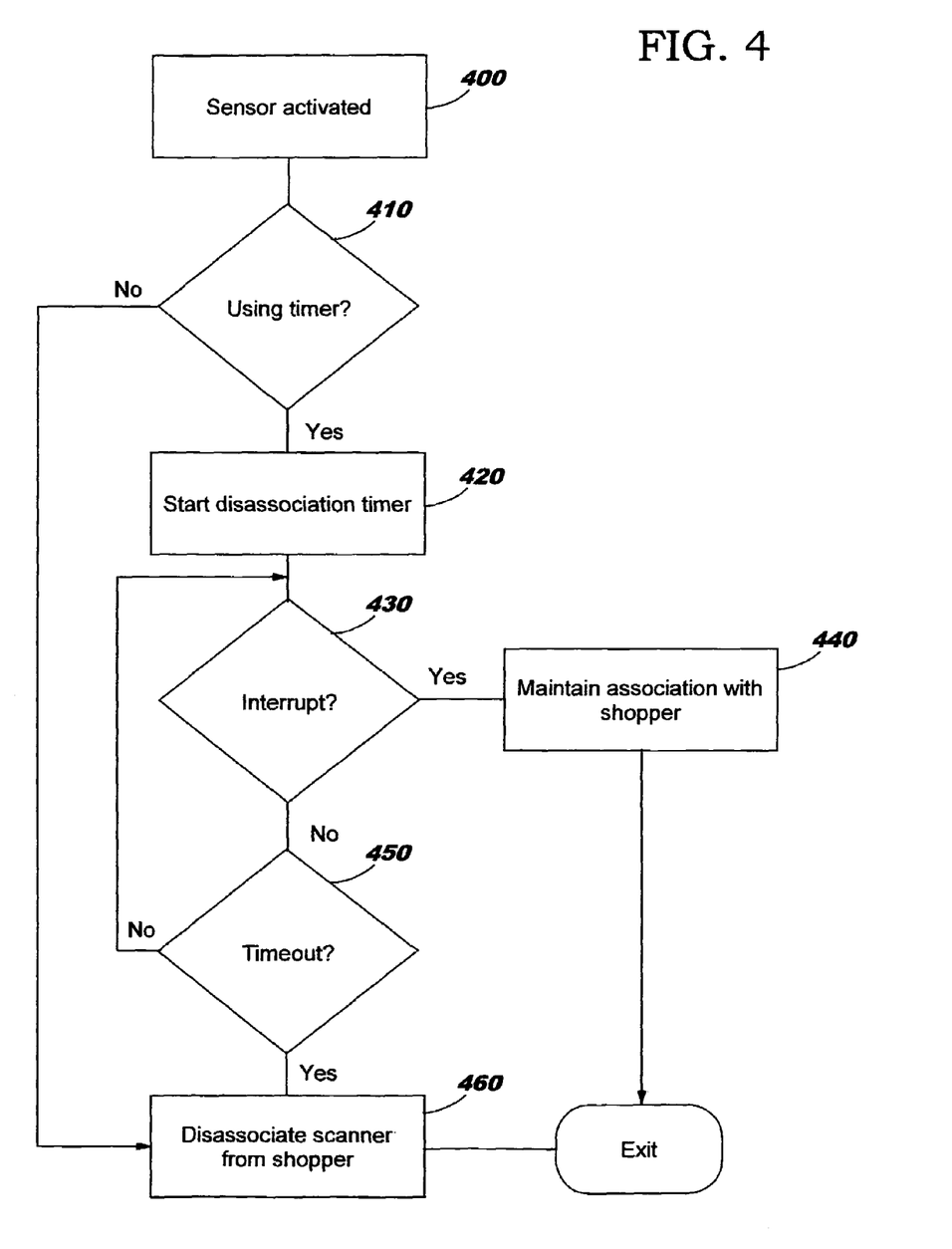
FIG. 4 illustrates automatic disassociation of a scanner device from a shopper.

Automatic disassociation with a particular shopper will now be discussed with reference to FIG. 4. A sensor, such as a light-triggered sensor, is preferably located on the scanner device such that the sensor is activated when the shopper is no longer in physical contact with the device. Typically, this occurs when the shopper sets down the device. For example, the sensor is preferably located such that, while the shopper holds the scanner device, the shopper's hand covers the sensor and thereby prevents it from being activated. (Refer to the discussion of sensor portion 250 of FIG. 2, above.) Once the shopper is no longer in full contact with the device, as indicated by the sensor activation (Block 400), preferred embodiments begin an automatic disassociation wherein a disassociation timer is used to filter out accidental sensor activation. Or, alternatively, the disassociation may be triggered immediately upon the device being put down. Accordingly, Block 410 tests to see if a disassociation timer is being used. The test in Block 410 has a negative result when the disassociation is to be triggered immediately. Optionally, embodiments of the present invention may enable the shopper to override use of a timer, for example by pressing a button on the scanner that is configured for immediate disassociation. The test in Block 410 also has a negative result when the shopper uses this timer override. Following a negative result at Block 410, control transfers to Block 460, discussed below.

When the test at Block 410 has a positive result (i.e., a disassociation timer is being used), Block 420 starts the timer. The timer length may be determined in various ways without deviating from the scope of the present invention. As one example, a shopper-specific timeout value may be obtained from a shopper profile when the shopper is identified. (The shopper's profile may provide other information, such as specifying that this shopper prefers to use the override button approach discussed above with reference to Block 410, rather than a timer. The test in Block 410 may therefore use information from the shopper's profile.) As another example, a merchant-specific value may be obtained (e.g., during the processing of FIG. 1 or FIG. 3 when accessing shopper information from the merchant's server or other repository). As yet another example, a timeout value (or overridable default value) may be configured in the scanner device by its manufacturer.

Block 430 tests to see if an interrupt occurs while the timer is ticking, indicating that the shopper is continuing to use the scanner device. For example, the barcode of another item (and an authentication token or perhaps the shopper's fingerprint, in a biometric embodiment) may be transmitted. When the test in Block 430 has a positive result, the association with the shopper is maintained (Block 440), thereby ending the disassociation processing before it completes. In this manner, an accidental sensor activation (e.g., whereby the scanner device slips from the shopper's hand) can be programmatically ignored. Control then exits from FIG. 4.

When the test in Block 430 has a negative result, on the other hand, control reaches Block 450 which tests to see if the timer has expired. If not, control returns to Block 430 and the timer continues ticking. (As will be obvious, the looping depicted for Blocks 430 and 450 is intended to illustrate use of events with the timer in a general sense.) If the test in Block 450 determines that the timer has expired, then the scanner device is disassociated from the shopper (Block 460). The processing of FIG. 4 then exits.

Techniques disclosed herein may be used with a wide variety of items and in a wide variety of establishments. The "shopper" referred to herein may be more generally referred to as a "user". Biometric information other than fingerprint scans may be captured by the scanner and used for identifying the shopper without deviating from the inventive techniques disclosed herein. Furthermore, while preferred embodiments have been described with reference to use of scanner devices such as the one illustrated in FIG. 2, this is by way of illustration and not of limitation: other types of mobile device may be used without deviating from the scope of the present invention. And while embodiments have been described herein with reference to scanning barcodes, this is by way of illustration and not of limitation: other types of item identifying information may be captured by the device without deviating from the scope of the present invention.

As will be appreciated by one of skill in the art, selected components of the present invention may be provided as methods, systems, and/or computer program products comprising computer-readable program code. Accordingly, the present invention may take the form of an entirely hardware embodiment. An embodiment combining software and hardware aspects might be used alternatively. Or, components of the present invention may be provided in a software embodiment (as described in the appended claims).

Furthermore, components of the invention may take the form of a computer program product accessible from computer-usable or computer-readable media providing program code for use by, or in connection with, a computer or any instruction execution system. For purposes of this description, a computer-usable or computer-readable medium can be any apparatus that can contain, store, communicate, propagate, or transport a program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, removable computer diskette, random access memory ("RAM"), read-only memory ("ROM"), rigid magnetic disk, and optical disk. Current example of optical disks include compact disk with read-only memory ("CD-ROM"), compact disk with read/write ("CD-R/W"), and DVD.

Figure 5:
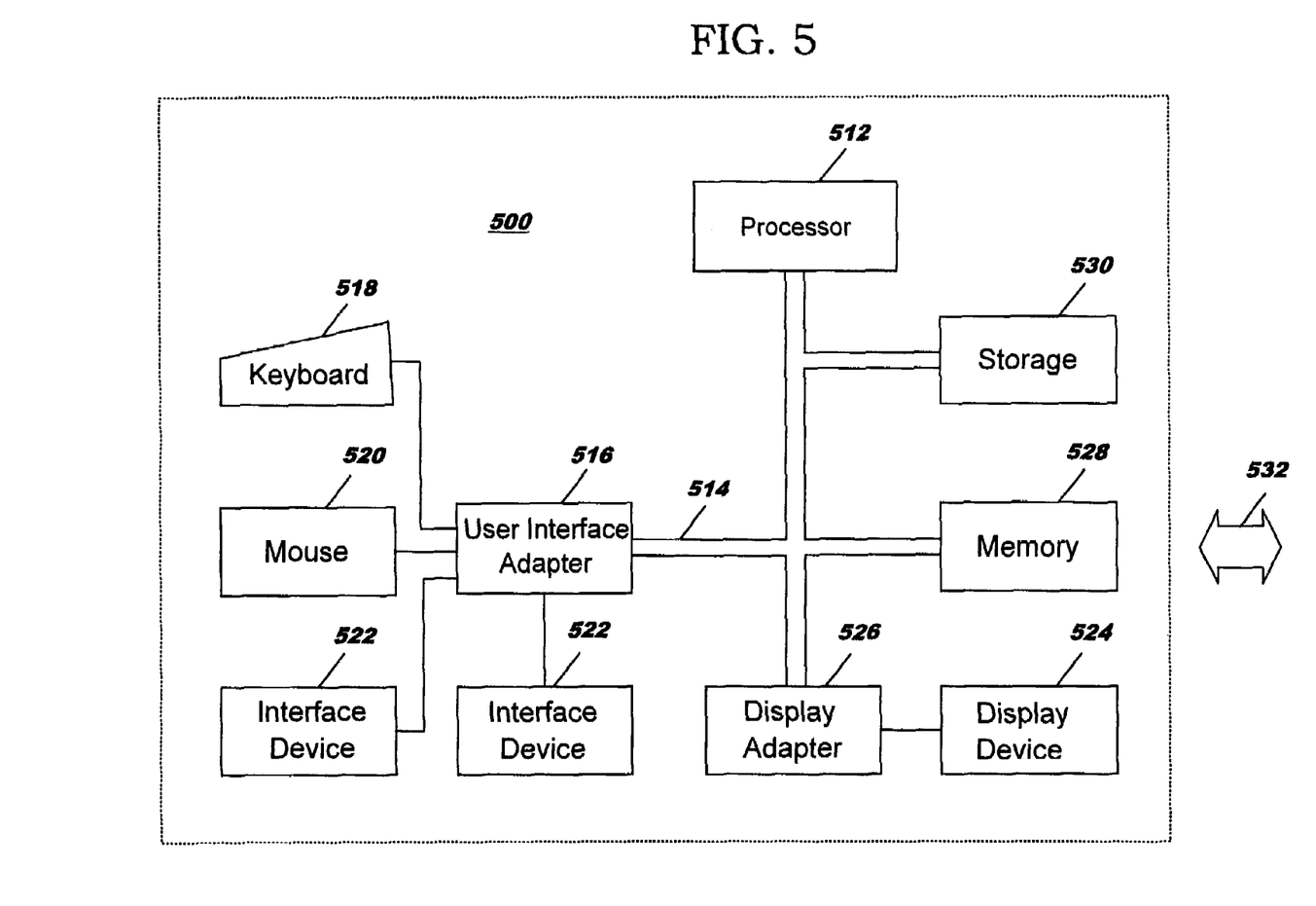
FIG. 5 depicts a data processing system suitable for storing and/or executing program code.

Referring now to FIG. 5, a data processing system 500 suitable for storing and/or executing program code includes at least one processor 512 coupled directly or indirectly to memory elements through a system bus 514. The memory elements can include local memory 528 employed during actual execution of the program code, bulk storage 530, and cache memories (not shown) which provide temporary storage of at least some program code in order to reduce the number of times code must be retrieved from bulk storage during execution.

Input/output (I/O") devices (including but not limited to keyboards 518, displays 524, pointing devices 520, other interface devices 522, etc.) can be coupled to the system either directly or through intervening I/O controllers or adapters (516, 526).

Network adapters may also be coupled to the system to enable the data processing system to become coupled to other data processing systems or remote printers or storage devices through intervening private or public networks (as shown generally at 532). Modems, cable modem attachments, wireless adapters, and Ethernet cards are just a few of the currently-available types of network adapters.

Figure 6:
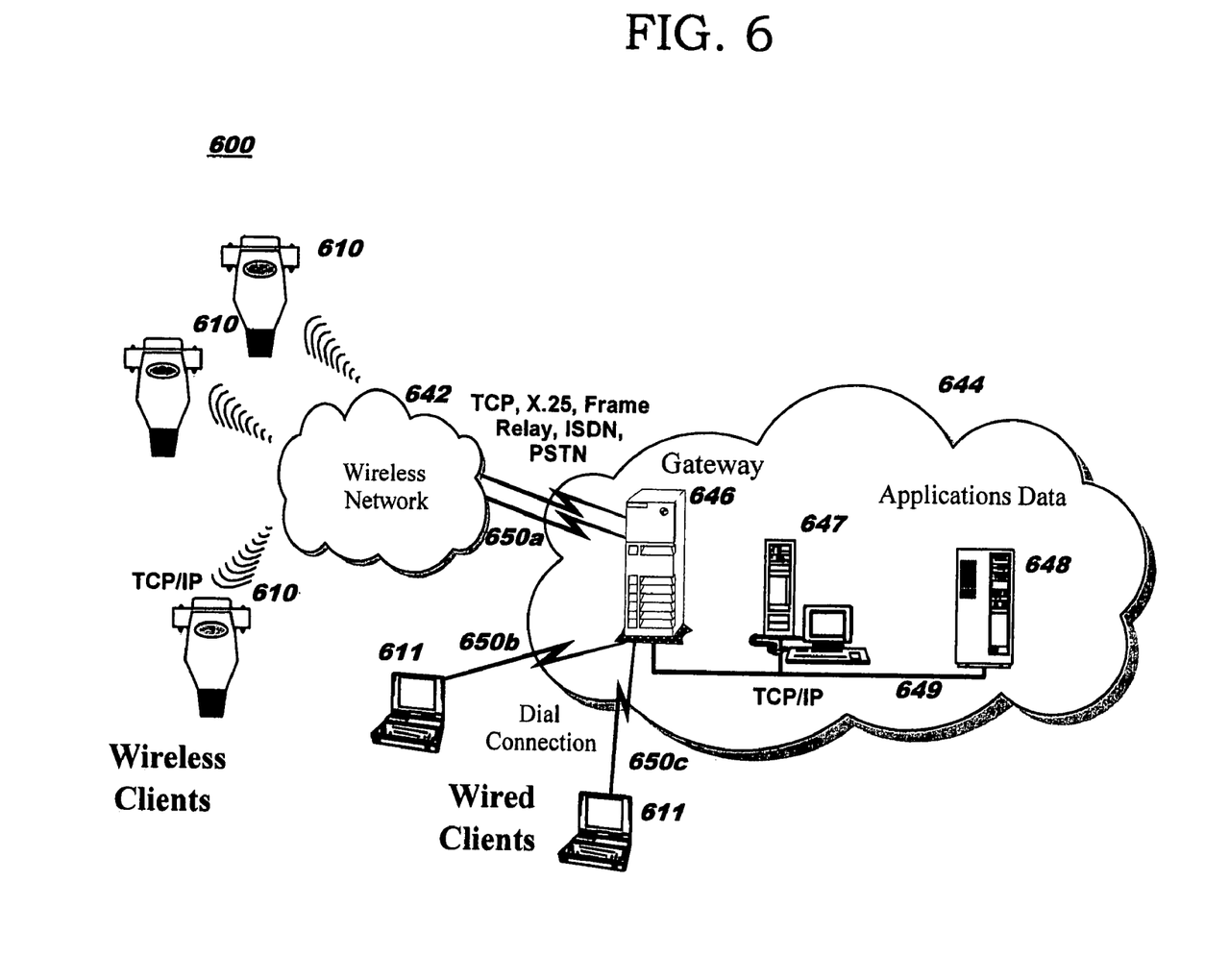
FIG. 6 depicts a representative networking environment in which one or more embodiments of the present invention may be used.

FIG. 6 illustrates a data processing network environment 600 in which the present invention may be practiced. The data processing network 600 may include a plurality of individual networks, such as wireless network 642 and network 644. A plurality of scanner devices 610 (as well as other devices, not shown) may communicate over wireless network 642, and a plurality of devices, shown in the figure (by way of illustration) as workstations 611, may communicate over network 644. Additionally, as those skilled in the art will appreciate, one or more local area networks ("LANs") may be included (not shown), where a LAN may comprise a plurality of devices coupled to a host processor.

Still referring to FIG. 6, the networks 642 and 644 may also include mainframe computers or servers, such as a gateway computer 646 or application server 647 (which may access a data repository 648). A gateway computer 646 serves as a point of entry into each network 644. The gateway 646 may be preferably coupled to another network 642 by means of a communications link 650a. The gateway 646 may also be directly coupled to one or more workstations 611 using a communications link 650b, 650c, and/or may be indirectly coupled to such devices. The gateway computer 646 may be implemented utilizing an Enterprise Systems Architecture/370™ available from the International Business Machines Corporation ("IBM®"), an Enterprise Systems Architecture/390® computer, etc. Depending on the application, a midrange computer, such as an Application System/400® (also known as an AS/400®) may be employed. ("Enterprise Systems Architecture/370" is a trademark of IBM; "IBM", "Enterprise Systems Architecture/390", "Application System/400", and "AS/400" are registered trademarks of IBM.)

The gateway computer 646 may also be coupled 649 to a storage device (such as data repository 648).

Those skilled in the art will appreciate that the gateway computer 646 may be located a great geographic distance from the network 642, and similarly, the scanner devices 610 and/or workstations 611 may be located some distance from the networks 642 and 644, respectively. For example, the network 642 may be located in California, while the gateway 646 may be located in Texas, and one or more of the workstations 611 may be located in Florida. The scanner devices 610 may connect to the wireless network 642 using a networking protocol such as the Transmission Control Protocol/Internet Protocol ("TCP/IP") over a number of alternative connection media, such as cellular phone, radio frequency networks, satellite networks, etc. The wireless network 642 preferably connects to the gateway 646 using a network connection 650a such as TCP or User Datagram Protocol ("UDP") over IP, X.25, Frame Relay, Integrated Services Digital Network ("ISDN"), Public Switched Telephone Network ("PSTN"), etc. The workstations 610 may connect directly to the gateway 646 using dial connections 650b or 650c. Further, the wireless network 642 and network 644 may connect to one or more other networks (not shown), in an analogous manner to that depicted in FIG. 6.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention. Furthermore, it should be understood that use of "a" or "an" in the claims is not intended to limit embodiments of the present invention to a singular one of any element thus introduced.

The invention claimed is:

1. A method of automatically associating a scanner device with a user, comprising:
   capturing, by a scanner device configured with a biometric sensor, biometric information of a user; and
   scanning, by the scanner device, item-identifying information of an item, such that the captured biometric information and the scanned item-identifying information can be transmitted to a computing device adapted for comparing the captured biometric information to previously-stored biometric information to identify the user and thereby automatically associating the scanner device with the identified user, such that the item for which the item-identifying information was scanned is also associated with the user, wherein:
   the scanner device is configured with a trigger portion;
   the biometric sensor is located in the trigger portion; and
   the capturing is automatically invoked when the user presses the triggering portion.

2. The method according to claim 1, wherein:
   the scanner device remains associated with the identified user until an automatic disassociation occurs; and
   the automatic disassociation occurs when the user activates a sensor of the scanner device.

3. The method according to claim 2, wherein the scanner device is configured such that the sensor is activated when the user no longer maintains physical contact with the scanner device.

4. The method according to claim 3, wherein the sensor is a light that remains covered while the user maintains the physical contact with the scanner device.

5. The method according to claim 2, wherein a disassociation timer is used to programmatically ignore accidental activation of the sensor, thereby preventing the automatic disassociation.

6. A method of automatically associating a scanner device with a user, comprising:
   capturing, by a scanner device, loyalty card information by scanning a loyalty card of a user, such that the captured loyalty card information can be transmitted to a computing device adapted for comparing the captured loyalty card information to previously-stored loyalty card information to identify the user and thereby automatically associating the scanner device with the identified user; and
   automatically disassociating the scanner device from the user when the user no longer maintains physical contact with the scanner device, wherein a sensor detects when the user no longer maintains the physical contact with the scanner device.

7. The method according to claim 6, wherein the sensor is located in a portion of the scanner device by which the user holds the scanner device.

8. A method of automatically associating a scanner device with a user, comprising:
   capturing, by a scanner device, loyalty card information by scanning a loyalty card of a user, such that the captured loyalty card information can be transmitted to a computing device adapted for comparing the captured loyalty card information to previously-stored loyalty card information to identify the user and thereby automatically associating the scanner device with the identified user; and
   automatically disassociating the scanner device from the user when the user no longer maintains physical contact with the scanner device, wherein a disassociation timer is used to programmatically ignore accidental loss of the physical contact, thereby preventing the automatic disassociation upon the accidental loss.

9. The method according to claim 8, wherein the disassociation timer ticks for a user-specific length of time.

10. The method according to claim 8, wherein the disassociation timer ticks for a length of time set by a manufacturer of the scanner device.

11. The method according to claim 8, wherein the automatic disassociation is programmatically ignored if the scanner device scans item-identifying information of another item while the disassociation timer is ticking.

12. A method of automatically disassociating a scanner device from a user, comprising steps of:

automatically associating a scanner device with a particular user upon matching identifying information of the particular user, captured by the scanner device, with previously-stored identifying information of a plurality of users;

adding items scanned by the scanner device to a shopping cart of the particular user while the scanner device remains associated with the particular user; and upon a detection, by a sensor of the scanner device, that the particular user is no longer in physical contact with the scanner device, automatically disassociating the scanner device from the particular user.

13. The method according to claim 12, wherein the identifying information of the particular user is biometric information of the particular user.

14. The method according to claim 13, wherein the biometric information is a fingerprint of the particular user.

15. The method according to claim 12, wherein the identifying information of the particular user is loyalty card information scanned from a loyalty card of the particular user.

* * * * *